(12) United States Patent
Gembala

(10) Patent No.: US 8,490,357 B2
(45) Date of Patent: *Jul. 23, 2013

(54) MODIFIED BASE PLY ROOF MEMBRANE SET IN A FORMULATED CONCRETE SLURRY OVER LIGHTWEIGHT CONCRETE

(76) Inventor: Henry Gembala, Deerfield Beach, FL (US)

(*) Notice: Subject to any disclaimer, the term of this patent is extended or adjusted under 35 U.S.C. 154(b) by 413 days.

This patent is subject to a terminal disclaimer.

(21) Appl. No.: 12/807,643

(22) Filed: Sep. 9, 2010

(65) Prior Publication Data

US 2011/0072749 A1 Mar. 31, 2011

Related U.S. Application Data

(63) Continuation-in-part of application No. 11/983,564, filed on Nov. 9, 2007, now Pat. No. 7,793,480.

(60) Provisional application No. 60/858,319, filed on Nov. 10, 2006.

(51) Int. Cl.
*E04B 7/02* (2006.01)
*E04B 7/06* (2006.01)

(52) U.S. Cl.
USPC ............ 52/409; 52/411; 52/745.06; 52/302.3

(58) Field of Classification Search
USPC ................... 52/409, 411, 746.11, 449, 405.1, 52/741.41, 745.06, 302.3, 302.1
See application file for complete search history.

(56) References Cited

U.S. PATENT DOCUMENTS

| | | | | |
|---|---|---|---|---|
| 4,937,990 A * | 7/1990 | Paquette | ........................ | 52/199 |
| 5,253,461 A * | 10/1993 | Janoski et al. | .................. | 52/408 |
| 6,729,093 B2 * | 5/2004 | Zambelli et al. | ............. | 52/405.1 |
| 6,769,215 B1 * | 8/2004 | Carkner | ......................... | 52/411 |
| 7,793,480 B2 * | 9/2010 | Gembala | ........................ | 52/409 |

* cited by examiner

*Primary Examiner* — Phi A
(74) *Attorney, Agent, or Firm* — Robert M. Downey, P.A.

(57) ABSTRACT

A series of parallel V-grooves are formed on the top surface of a new or existing top coat of lightweight insulating concrete of a roof deck. A slurry coat of formulated concrete is then applied to the top coat of lightweight insulating concrete at locations in between the parallel V-grooves, to repair cracks and holes and attach a base ply roof membrane, thereby eliminating the need for a base sheet and mechanical fasteners when installing a roof membrane system on the lightweight concrete deck of a roof structure. The formulated concrete slurry comprises a mixture of Portland cement (type I), cellulose, poly vinyl alcohol, and water. A base ply (modified or single ply) roof membrane having a sanded or fleece bottom side is set into a ¼ inch thick slurry coat of the formulated concrete to effectively attach the base ply roof membrane to the lightweight concrete deck.

16 Claims, 3 Drawing Sheets

MODIFIED BASE PLY ROOF MEMBRANE SET IN A FORMULATED CONCRETE SLURRY OVER LIGHTWEIGHT CONCRETE

This application is a continuation-in-part (CIP) of non-provisional patent application Ser. No. 11/983,564 filed on Nov. 9, 2007 now U.S. Pat. No. 7,793,480, which is based on provisional patent application Ser. No. 60/858,319 filed on Nov. 10, 2006.

BACKGROUND OF THE INVENTION

1 Field of the Invention

The present invention relates to roofing systems, and, more particularly, to roofing systems that use lightweight insulating concrete with an overly base ply sheet and cap membrane on flat or low sloped roof areas.

2 Discussion of the Related Art

Generally, roof systems that use lightweight concrete with or without insulation require a base sheet membrane to be mechanically installed to the lightweight concrete for the purpose of allowing moisture to migrate. Once the base sheet is mechanically attached to the lightweight concrete, additional layers of roofing membrane are attached to the base sheet by either self adhesive, heat weld or cold adhesive. This bonds the membranes together to make up the roof assembly. Despite the widespread use of the mechanically attached base sheet membrane, used in flat and low sloped roof systems, there are significant drawbacks associated with its use. In particular, the increased amount of penetrating fasteners that need to be installed in order to meet the wind uplift requirements actually damage the lightweight the concrete at corners and along the perimeter of the roof. The resultant damage to the lightweight concrete, caused by the closely spaced fasteners, eventually leads to deck failure. Furthermore, when the roof needs to be replaced, requiring removal of the base sheet and fasteners, holes are left in the lightweight concrete. Thereafter, a new base sheet membrane is installed, and new fasteners penetrate additional areas of the existing lightweight concrete deck. Consequently, further damage is caused to the lightweight concrete deck.

It should be noted that the benefit of using lightweight concrete in lieu of insulation is not only to provide a slope for the roof system, but also to provide the owner with an insulating system that will remain intact after re-roofing and continue to provide the owner the slope and insulating value for all future roof systems.

In view of these shortcomings of the traditional mechanically attached base sheet membrane, there exists an urgent need in the roofing industry for an alternative venting system for new and existing lightweight concrete deck structures which overcomes the above described problems. More specifically, there is a need for a venting system that will allow moisture to travel to the perimeter of the roof, where the moisture can exit the roof assembly. Further, there is a need for venting the top side of a new or existing lightweight concrete deck which will considerably reduce costs for labor and material by eliminating the installation of the base sheet membrane and fasteners that are currently required for attachment to the lightweight concrete deck.

SUMMARY OF THE INVENTION

The present invention is directed to a system and method of installation of a roof membrane system having an improved roof venting system that eliminates the need of a base sheet membrane that is presently used and that is mechanically attached with fasteners to new or existing lightweight concrete. An improved venting system is achieved by installing an arrangement of V-grooves in existing lightweight concrete or, alternatively, during the installation of new lightweight concrete. The V-grooves are approximately ¾ inch to 2 inches wide and ½ inch to 1 inch deep and are spaced approximately 3 to 12 inches apart. A slurry coat of formulated concrete approximately ⅛ inch to ½ inch is then applied to the layer of lightweight concrete at all locations not having an installed V-groove, which repairs stress cracks and holes. The formulated concrete slurry further serves to attach a base ply roof membrane, thereby eliminating the need for a base sheet and mechanical fasteners when installing the roof membrane system on the lightweight concrete deck of a roof structure. The formulated concrete slurry comprises a mixture of portland cement (type I), cellulose, poly vinyl alcohol, and water. A base ply (modified or single ply) roof membrane having a sanded or fleece bottom side is set into the formulated concrete slurry to effectively attach the base ply roof membrane to the lightweight concrete deck.

Objects and Advantages of the Invention

Considering the foregoing, it is a primary object of the present invention to eliminate the use of the mechanically attached base sheet currently used in flat or low sloped roof system and to provide the new or existing lightweight concrete with V-grooves on the top surface which replace the function of the base sheet and allow the venting of moisture to travel to the roof perimeter and exit the roof system.

It is a further object of the present invention to provide an improved method of installing a roof membrane system to a lightweight insulating concrete deck which eliminates the need for mechanical fasteners that compromise the integrity of the lightweight concrete.

It is a further object of the present invention to provide an improved method for installing a roof membrane system to a lightweight insulating concrete deck on a roof structure which repairs stress cracks in a new or existing lightweight insulating concrete top coat, while also serving as a means of attachment of a base ply membrane to the new or existing lightweight concrete top coat.

It is still a further object of the present invention to provide an improved method for installing a roof membrane system to a lightweight insulating concrete deck on a roof structure which provides for attachment of a base ply membrane to a new or existing lightweight concrete deck without compromising the structural integrity of the lightweight concrete.

It is still a further object of the present invention to provide a formulated concrete mixture for application as a slurry coat to the top coat of lightweight insulating concrete of a roof structure, and wherein the formulated concrete slurry provides a means of attachment of a base ply membrane to the underlying lightweight concrete deck, while also repairing stress cracks in the new or existing lightweight concrete deck.

It is still a further object of the present invention to provide a formulated concrete mixture for use as a slurry coat to attach a base ply membrane to a lightweight concrete deck of a roof structure without the need of mechanical fasteners, and wherein the formulated concrete slurry repairs stress cracks and holes from previous mechanical fasteners that have been removed from the lightweight concrete.

It is still a further object of the present invention to provide a formulated concrete mixture for use as a slurry coat to effectively attach a base ply membrane to a new or existing lightweight insulating concrete deck of a roof structure, while simultaneously repairing stress cracks or holes all in one application, resulting in substantial cost savings.

These and other objects and advantages of the invention are more readily apparent with reference to the detailed description and accompanying drawings.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
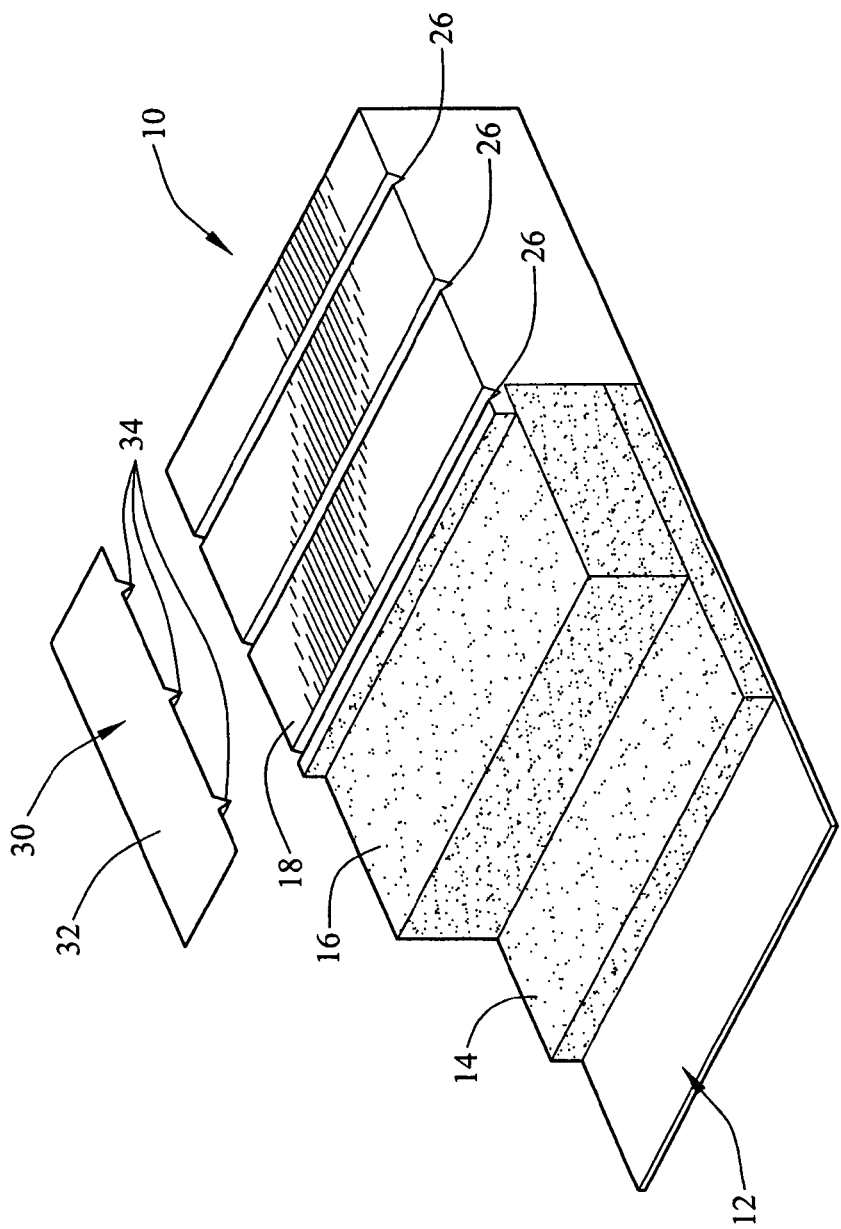
FIG. 1 is an isolated perspective view, shown in cross section, illustrating a roof structure and the formation of V-grooves in the top side of a lightweight insulating concrete top coat with the use of a raking tool.
Figure 2:
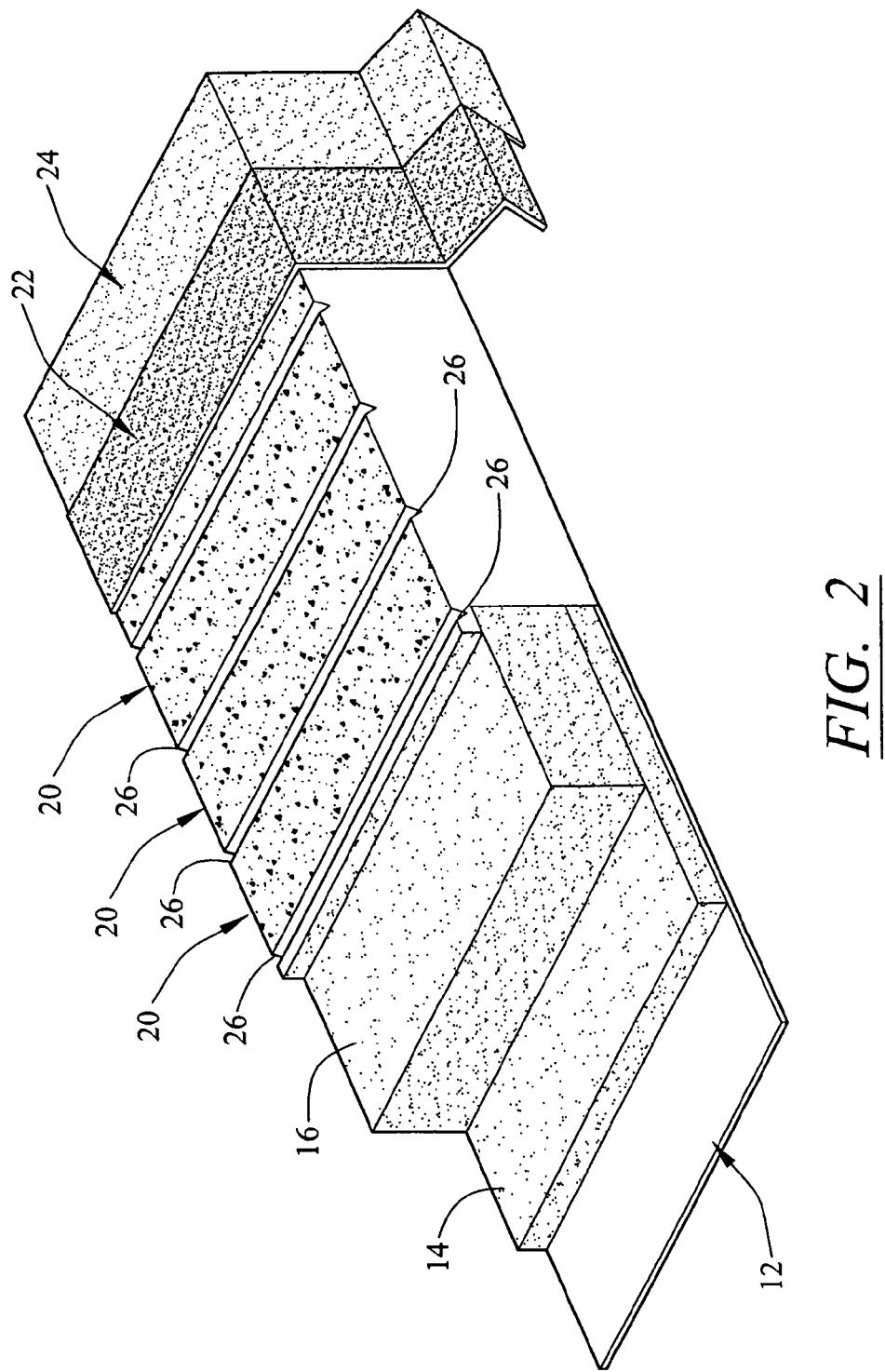
FIG. 2 is an isolated perspective view, shown in cross section, illustrating the structural layers of the roof structure of FIG. 1, including V-grooves installed within the lightweight insulating concrete, and further illustrating a base ply roof membrane attached to the lightweight insulating concrete top coat using a formulated concrete slurry that eliminates the need of a base sheet and mechanical fasteners.
Figure 3:
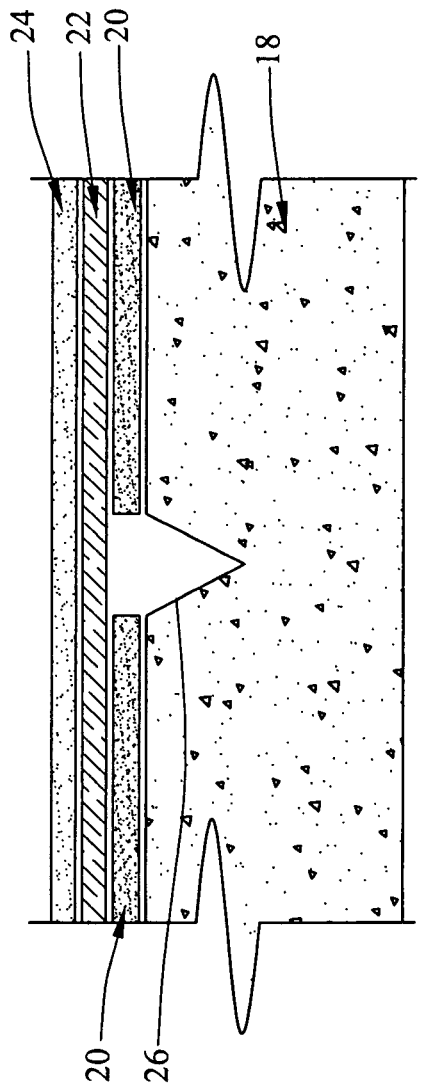
FIG. 3 is a cross sectional view illustrating the separate structural layers of the roof system of FIG. 2.

As shown in FIGS. 1-3, a roof system 10 includes a roof deck 12, a slurry coat of lightweight insulating concrete 14, a layer of EPS (expanded poly styrene) board insulation 16, and a lightweight insulating concrete top coat 18. A series of parallel V-grooves 26, spaced approximately 3 inches to 12 inches apart, are installed on the top surface of the lightweight insulating concrete top coat 18. The V-grooves 26 are approximately ¾ inch to 2 inches wide and ½ inch to 1 inch deep. The V-grooves 26 allow heat and moisture to migrate (i.e., within the V-grooves 26) to the perimeter of the low sloped roof and to exit the roof system 10.

During installation of new lightweight insulating concrete top coat 18, the V-grooves 26 are formed using a rake tool 30, as seen in FIG. 1. In a preferred embodiment, the rake tool 30 has a 4 inch wide by 4 foot long aluminum flat bar 32 having an arrangement of spaced V-groove forming blades 34 on the bottom side. While not shown, the rake tool 30 preferably has an elongate pole with a handle. The pole is fixed to the flat bar and extends upwardly at an angle to facilitate ease of use. The rake 30 is dragged across the top coat 18 to form the V-grooves 26.

Once the V-grooves 26 are formed in the lightweight concrete top coat 18, a slurry of formulated concrete mixture 20 is applied to the top surface of the lightweight insulating top coat 18, with the exception of the portions having V-grooves 26, to fill in stress cracks and holes. Immediately after application of the formulated concrete slurry 20, and before the formulated concrete mixture 20 cures, a single or modified base ply membrane 22 is applied over the formulated concrete slurry 20 to effectively attach the base ply membrane 22 to the lightweight concrete top coat 18. The additional layers of roofing membrane 24 may be attached by self adhesion, heat welding, or cold adhesive in order to bond the membranes together as a membrane system covering the lightweight concrete deck.

Typically, a series of parallel V-grooves 26 is only required if the atmospheric conditions have a high moisture content, or if the moisture content in the lightweight concrete top coat 18 and formulated concrete slurry 20 is high, which will be the case when installing a new roof system. On existing lightweight concrete or gypsum decks, the V-grooves 26 are cut with the use of a carbine blade on a rotary saw, afterwhich the formulated concrete slurry 20, the single or modified base ply membrane 22, and roofing membrane 24 are installed in the manner described above.

While the present invention has been shown and described in accordance with a preferred and practical embodiment thereof, it is recognized that departures from the instant disclosure are contemplated within the spirit and scope of the present invention.

What is claimed is:

1. A roof system comprising:
    a roof deck;
    a first layer of lightweight insulating concrete;
    a layer of board insulation;
    a second layer of lightweight insulating concrete defining a top coat, and said second layer of lightweight insulating concrete having a top surface;
    an arrangement of grooves formed in said top surface of said second layer of lightweight insulating concrete deck, each of said grooves having a V-shaped cross-sectional configuration and said grooves being structured and disposed for directing moisture and liquid to the perimeter of the roof system;
    a slurry coat of a concrete composition applied over said top coat in between said arrangement of grooves for filling in cracks and holes in said top coat, and said concrete composition of said slurry coat comprising:
        portland cement;
        cellulose;
        poly vinyl alcohol; and
        water;
    a base ply membrane attached to said slurry coat during curing of said concrete composition; and
    at least one layer of roofing membrane attached to said base ply membrane.

2. The roof system as recited in claim 1 wherein said grooves are arranged in spaced, parallel relation on said top surface of said lightweight insulating concrete deck.

3. The roof system as recited in claim 1 wherein said grooves are at least 0.5 inch deep.

4. The roof system as recited in claim 1 wherein said grooves are between a 0.5 inch and 1.0 inch deep.

5. The roof system as recited in claim 1 wherein said grooves are 0.75 inch to 2 inches wide.

6. The roof system as recited in claim 1 wherein said grooves are arranged at spaced, parallel intervals of between 3 inches and 12 inches apart.

7. The roof system as recited in claim 1 wherein said board insulation is expanded poly styrene.

8. A method of installing a roof membrane system to a roof structure having a roof deck, at least one layer of lightweight insulating concrete, a layer of board insulation, and a top coat layer of lightweight insulating concrete having a top surface, said method comprising the steps of:
    forming an arrangement of grooves in said top surface of said top coat layer of lightweight insulating concrete deck, each of said grooves having a V-shaped cross-sectional configuration;
    applying a slurry coat of a concrete composition comprising portland cement, cellulose, poly vinyl alcohol and water over said top coat of lightweight insulating concrete and filling in cracks and holes in said top coat;

applying a base ply membrane on top of said slurry coat before said concrete composition cures;

allowing said base ply membrane to become bonded with said slurry coat and said top coat as said slurry coat of said concrete composition cures; and subsequently attaching at least one layer of roofing membrane to said base ply membrane.

9. The method as recited in claim 8 wherein said step of forming said arrangement of grooves in said top surface further comprises:

moving a rake having a plurality of groove forming blades over said top surface of said lightweight insulating concrete deck during a finishing step of applying said lightweight insulating concrete deck to the top roof deck structure.

10. The method as recited in claim 8 wherein said step of forming said arrangement of grooves in said top surface further comprises the step of:

cutting said arrangement of grooves with a rotary saw.

11. The method as recited in claim 8 wherein each of the grooves in said arrangement of grooves has a V-shaped cross-sectional configuration and a depth ranging between 0.5 inch and 1.0 inch.

12. The method as recited in claim 8 wherein each of the grooves in said arrangement of grooves has a V-shaped cross-sectional configuration and a width of 0.75 inch to 2 inches.

13. The method as recited in claim 8 wherein each of the grooves in said arrangement of grooves are arranged at spaced, parallel intervals of between 3 inches and 12 inches apart.

14. The method as recited in claim 8 wherein said step of subsequently attaching said at least one layer of roofing membrane further comprises the step of:

attaching said at least one layer of roofing membrane to said base ply membrane by self adhesion.

15. The method as recited in claim 8 wherein said step of subsequently attaching said at least one layer of roofing membrane further comprises the step of:

attaching said at least one layer of roofing membrane to said base ply membrane by heat welding.

16. The method as recited in claim 8 wherein said step of subsequently attaching said at least one layer of roofing membrane further comprises the step of:

attaching said at least one layer of roofing membrane to said base ply membrane by cold adhesive.

\* \* \* \* \*